United States Patent Office 3,452,010
Patented June 24, 1969

3,452,010
1,3,4,6,7,11b-HEXAHYDRO-1,4-OXAZINO
[3,4-a]-ISOQUINOLINES
Rolf Pohlke, Griesheim, near Darmstadt, and Siegmund Sommer and Ernst Schorscher, Darmstadt, Germany, assignors to E. Merck AG, Darmstadt, Germany
No Drawing. Filed Aug. 18, 1966, Ser. No. 573,175
Claims priority, application Germany, Aug. 19, 1965,
M 66,370
Int. Cl. C07d 99/04, 87/50; A61k 27/00
U.S. Cl. 260—244                                13 Claims

ABSTRACT OF THE DISCLOSURE

For increasing the rate of flow of blood, as in the treatment of angina pectoris, compounds of the following formula, acid addition salts thereof, and quaternary ammonium salts thereof:

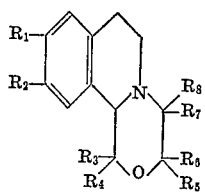

such a compound being for example 1,3,4,6,7,11b-hexahydro-1,4-oxazino[3,4-a]-isoquinolines.

---

This invention relates to novel isoquinolines, and in particular to 1,3,4,6,7,11b-hexahydro-1,4-oxazino[3,4-a]-isoquinolines.

An object of this invention is to provide novel, useful, and unobvious chemical compounds.

Another object is to provide pharmaceutical compositions and methods of administration for mammals wherein a stimulating effect on blood circulation is obtained, and especially wherein a substantial specific sympathicomimetic effect is simultaneously avoided.

Other objects include processes for the production of the novel compounds of this invention, as well as any novel intermediates or starting materials required for such processes.

Upon further study of the specification and claims, other objects and advantages of the present invention will become apparent.

For the attainment of the objects of this invention, there are provided 1,3,4,6,7,11b-hexahydro-1,4-oxazino-[3,4-a]-isoquinoline compounds of Formula I, acid addition salts, and quaternary ammonium salts thereof, as follows:

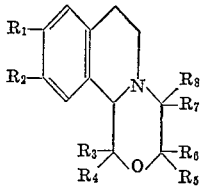

wherein $R_1$ and $R_2$ are each H, alkyl of 1–4 carbon atoms, methoxy, ethoxy, Cl, Br, or together methylenedioxy, and $R_3$ to $R_8$ each represents H; unsubstituted alkyl of 1–10 carbon atoms, or alkyl of a total of 1–10 carbon atoms substituted by Cl, Br, OH, alkoxy, aryloxy, amino, or alkylated amino; unsubstituted aryl of 6–10 carbon atoms, or aryl of a total of 6–10 carbon atoms substituted by alkyl, F, Cl, Br, OH, alkoxy, methylenedioxy, or dialkylamino; or unsubstituted aralkyl of 7–10 carbon atoms, or aralkyl of a total of 7–10 carbon atoms substituted by alkyl, F, Cl, Br, OH, alkoxy, methylenedioxy, or dialkylamino.

These compounds can stimulate the circulation of blood in mammals. Certain compounds in particular can improve blood flow through the heart by stimulating the total circulation, without exhibiting a specifically sympathicomimetic effect. Such substances can thus be employed as drugs in the treatment of angina pectoris.

For example, it was demonstrated that the unsubstituted 1,3,4,6,7,11b-hexahydro - 1,4 - oxazino[3,4-a]-isoquinoline, as well as the 3-methyl derivative and the 9,10-dimethoxy derivative thereof, effected, in anesthetized dogs, over a wide dosage range (0.1–5.0 mg./kg.) intravenously a moderate, but prolonged increase in blood pressure, and an increased flow through the sinus coronarius. When employing even higher dosages, however, the blood pressure was lowered and the adrenaline, noradrenaline, and N-isopropyl-noradrenaline effect was weakened. It is thus left to the clinician to derive the optimum dosage for the compounds as stimulants; but this can be done by routine experimentation.

The compounds of this invention can be produced by processes comprising the treatment of a compound of Formulae II, III, IV, or V with a cyclizing agent which splits out HZ:

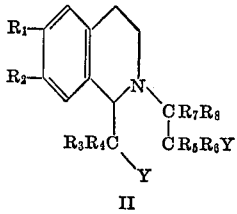 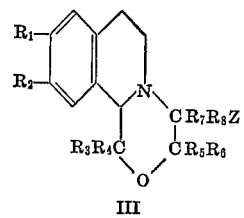

II                                III

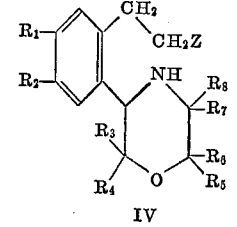 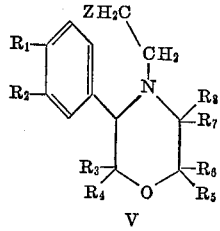

IV                                V wherein

In Formula II, one of the residues Y represents a free OH—group, and the other residue Y represents Z, Z in all cases represents an OH—group which is, if desired, esterified or etherified, Cl, Br, or I, and $R_1$ through $R_8$ are defined as previously indicated.

Alternatively, a compound having the basic structure of Formula I is treated with reducing agents, which compound contains, in the heterocyclic rings, one or several reducible groups, preferably a carbonyl group, in the 4-, 6-, or 7-position, or a hydroxy group in the 7-position, and/or one or several double bonds, preferably in the 6,7- and, if desired, additionally in the 11b,1- and/or in the 3,4-position, or in the 5,11b- and optionally also in the 3,4- and/or 6,7-position. When there is a double bond in the 5,11b-position, the compound is in the form of a corresponding quaternary salt.

Another possibility is that a compound of Formula I is converted, by treatment with an acid, into a physiologically compatible acid addition salt, or by treatment with an alkylating agent, into a physiologically compatible quaternary ammonium salt.

A further possibility is that a base of Formula I is liberated from one of its acid addition salts.

Alkyl groups suitable for use in the residues $R_1$ to $R_8$ are preferably: methyl, ethyl, n-propyl, isopropyl, n-butyl, isobutyl, sec.-butyl, and tert.-butyl. $R_3$ to $R_8$ can furthermore represent, for example, n-amyl, isoamyl, 2-methylbutyl-(1), pentyl-(2), pentyl-(3), 3-methylbutyl-(2), neopentyl, tert.-amyl, n-hexyl, and isohexyl.

The alkyl groups can be optionally substituted. Substituents which are particularly preferred are chlorine, bromine, hydroxy, alkoxy, aryloxy, amino, monoalkylamino, dialkylamino. Accordingly, preferred substituted alkyl groups in the residues $R_3$ to $R_8$ are hydroxyalkyl, aryloxyalkyl, chloroalkyl, bromoalkyl, aminoalkyl, monoalkylaminoalkyl, and dialkylaminoalkyl groups, for example, 2-hydroxyethyl, 3-hydroxypropyl, 4-hydroxybutyl, 5-hydroxypentyl, 6-hydroxyhexyl, methoxyethyl, ethoxymethyl, phenoxymethyl, 2-phenoxyethyl, chloromethyl, 2-chloroethyl, bromomethyl, 2-bromomethyl, 2-aminoethyl, 3 - aminopropyl, 4 - aminobutyl, 2 - methylaminoethyl, 3-methylaminopropyl, 4-methylaminobutyl, 2-dimethylaminoethyl, 2-diethylaminoethyl, 3-dimethylaminopropyl, and 3-diethylaminopropyl. In the dialkylamino groups, the two alkyl residues can also be connected with each other in the form of a ring, and the ring can contain a further hetero-atom. Thus, for example, the following residues are furthermore suitable: 2-pyrrolidinoethyl, 3-pyrrolidinopropyl, 2-piperidinoethyl, 3-piperidinopropyl, 2-morpholinoethyl, 3-morpholinopropyl, 2-(N-methylpiperazino)-ethyl, 3-(N-methylpiperazino)-propyl.

Aryl is preferably phenyl, 1- or 2-naphthyl. Aralkyl groups suitable in this connection are, for example, benzyl, 1- and 2-phenylethyl, 3-phenylpropyl, and 4-phenylbutyl.

The aryl or aralkyl groups can be substituted, if desired. Preferred substituents are: alkyl, fluorine, chlorine, bromine, hydroxy, lower alkoxy, such as methoxy and ethoxy, methylenedioxy, dialkylamino. Correspondingly, the following compounds can be the aryl or aralkyl residues: o-, m-, or p-tolyl, 2,4-dimethylphenyl, o-, m-, or p-ethylphenyl, p-isopropylphenyl, 2-methyl-5-isopropylphenyl, o-, m-, or p-fluorophenyl, o-, m-, or p-chlorophenyl, 2,3-, 2,4-, 2,5,- 2,6-, 3,4-, or 3,5-dichlorophenyl, 2,4,6-trichlorophenyl, o-, m-, or p-bromophenyl, 2,4-dibromophenyl, o-, m-, or p-hydroxyphenyl, 3,4-dihydroxyphenyl, o-, m-, or p-methoxyphenyl, 3,4-dimethoxyphenyl, 3,4,5-trimethoxyphenyl, 2-methoxy-5-methylphenyl, o-, m-, or p-ethoxyphenyl, 3-methoxy-4-hydroxyphenyl, 3,4-methylenedioxyphenyl, o-, m-, or p-dimethylaminophenyl, o-, m-, or p-methylbenzyl, o-, m-, or p-fluorobenzyl, o-, m-, or p-chlorobenzyl, and o-, m-, or p-methoxybenzyl.

The residue Z represents OH, Cl, Br, I, esterified OH, preferably formyloxy, acetoxy, methanesulfonyloxy, benzenesulfonyloxy, p-toluenesulfonyloxy, or etherified OH, such as methoxy or benzyloxy.

The compounds of Formula I are obtainable by treating the compounds of Formulae II, III, IV, or V with cyclizing agents which split out HZ.

As starting compounds of Formulae II and III, the following 1,2,3,4-tetrahydroisoquinolines are mainly preferred:

1-hydroxymethyl-2-(2-hydroxyethyl)-,
1-benzoyloxymethyl-2-(2-hydroxyethyl)-,
1-hydroxymethyl-2-(2-chloroethyl)-,
1-hydroxymethyl-2-(2-bromoethyl)-,
1-benzoyloxymethyl-2-(2-bromoethyl)-,
1-(p-toluenesulfonyloxymethyl-2-(2-hydroxyethyl)-,
1-hydroxymethyl-2-(2-p-toluenesulfonyloxyethyl)-,
1-chloromethyl-2-(2-hydroxyethyl)-,
1-bromomethyl-2-(2-hydroxyethyl)-,
1-[(2-hydroxyethoxy)-methyl]-,
1-[(2-bromoethoxy)-methyl]-,
1-[(2-chloroethoxy)-methyl]-, and
1-[(2-p-toluenesulfonyloxyethoxy)-methyl]-1,2,3,4-tetrahydroisoquinoline.

Further preferred are the derivatives of these compounds substituted as set forth above in the side chains and/or in the 6- and/or 7-position of the tetrahydroisoquinoline ring.

Preferred compounds of Formulae IV and V are the following:

3-[o-(2-hydroxyethyl)-phenyl]-morpholine,
3-[o-(2-chloroethyl)-phenyl]-morpholine,
3-[o-(2-bromoethyl)-phenyl]-morpholine,
3-[o-(2-p-toluenesulfonyloxy)-phenyl]-morpholine,
4-(2-chloroethyl)-3-phenyl-morpholine,
4-(2-bromoethyl)-3-phenyl-morpholine, and
4-(2-hydroxyethyl)-3-phenyl-morpholine;

furthermore the derivatives of these compounds substituted as set forth above in the 2-, 5-, and/or 6-position of the morpholine ring and/or in the m- and/or the p-position of the phenyl ring.

The compounds of Formulae II to X are either known or they can easily be prepared analogously to known compounds. For example, 1-hydroxymethyl-isoquinolines of Formula A.

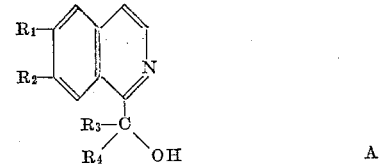

wherein $R_1$ to $R_4$ have the above-indicated meanings, can be reduced catalytically to the corresponding 1,2,3,4-tetrahydro compounds, and the latter can be reacted with ethylene oxide, 2-chloroethanol, or 2-bromoethanol, to form 1-hydroxymethyl - 2 - (2-hydroxyethyl)-1,2,3,4-tetrahydroisoquinolines. If, in place of ethylene oxide, substituted ethylene oxides are employed, the corresponding diols of Formula II (Y=Z=OH) are obtained. For example, from 1 - hydroxymethyl - 1,2,3,4-tetrahydroisoquinoline, there can be obtained:

With propylene oxide: 1-hydroxymethyl-2-[2-hydroxypropyl-(1)]-1,2,3,4-tetrahydroisoquinoline;

With styrene oxide: 1 - hydroxymethyl-2-(2-hydroxy-2-phenylethyl)-1,2,3,4-tetrahydroisoquinoline;

With epichlorohydrin: 1-hydroxymethyl-2-[3-chloro-2-hydroxypropyl-(1)]-1,2,3,4-tetrahydroisoquinoline;

With 1,2-dimethyl ethylene oxide: 1-hydroxymethyl-2-[2-hydroxybutyl-(2)]-1,2,3,4-tetrahydroisoquinoline;

With 1,1-dimethyl ethylene oxide: 1-hydroxymethyl-2-[2 - hydroxy - 2-methylpropyl-(1)]-1,2,3,4-tetrahydroisoquinoline;

With phenoxymethylethylene oxide: 1-hydroxymethyl-2 - [2-hydroxy-3-phenoxypropyl-(1)]-1,2,3,4-tetrahydroquinoline.

The 1-hydroxymethyl-isoquinolines of the above-mentioned Formula A are, in turn, obtainable by reacting 1-cyano-2-benzoyl-1,2-dihydro-isoquinoline, substituted, if desired, in the 6-and/or 7-position, with phenyl lithium or a carbonyl compound $R_3R_4C=O$, for example, formaldehyde, acetaldehyde, acetone, benzaldehyde, 3,4-dimethoxybenzaldehyde, 3,4 - methylenedioxybenzaldehyde, phenylacetaldehyde. The 1-benzoyloxymethyl-isoquinoline obtained in this manner is subsequently saponified under alkaline conditions to the 1-hydroxymethyl compound.

Compounds of Formula III are obtainable, for example, by reacting 1-hydroxymethyl-isoquinoline with 2-chloroethanol in the presence of strong bases (for example, alkali metal alcoholates) and subsequent hydrogenation of the heterocyclic ring. The thus-obtained alcohol can be converted with thionyl chloride into the corresponding chloro compound, or with phosphorus tribromide into the bromo compound, or with p-toluenesulfochloride into the p-toluenesulfonyloxy compound.

The compounds of Formula IV can be produced by reduction of 3-(2-carboxymethylphenyl)-morpholines. The resultant 2-hydroxyethyl compound can be optionally reacted thereafter with, for example, thionyl chloride, phosphorus tribromide, or p-toluenesulfochloride. Furthermore, it is possible, for example, to react o-bromobenzaldehyde, via o-bromophenyl glycine and 2-amino-2-(o- bromophenyl)-ethanol, to 3-(o-bromophenyl)-morpholine. Still further, after protecting the amino group, for example by acetylation, the Grignard compound can be produced by reacting the compound with magnesium; the Grignard compound further reacts with ethylene oxide. After the N-acetyl group has been split off, there is obtained 3-[o-(2-hydroxyethyl)-phenyl]-morpholine.

Compounds of Formula V are obtainable, for example, by reacting 3-phenyl-morpholines with 1,2-dibromo- or 1,2-dichloroethane derivatives. The 3-phenyl-morpholines are obtainable by reducing phenyl glycines to 2-phenyl-2-aminoethanols, subsequent reaction with ethylene oxides, and cyclization.

The cyclization of the compounds of Formula II is conducted in accordance with methods conventional for the production of cyclic ethers of the morpholine type. Diols of Formula II (Y=Z=OH) can be converted into the desired cyclic ethers preferably by heating with acidic catalysts. Catalysts particularly suitable in this connection are: hydrogen chloride (for example, concentrated aqueous hydrochloric acid), hydrogen bromide, phosphoric acid, sulfuric acid (concentration between about 50 and 98%), sulfonic acids, such as p-toluenesulfonic acid, acidic ion exchangers, Lewis acids, such as zinc chloride, acid anhydrides, such as acetic anhydride. The above-mentioned acids can be employed either in the anhydrous or in the aqueous form. If desired, there is used an additional inert solvent, such as benzene, toluene, or xylene. Reaction temperatures for the diol cyclization are in the range of about 50–200° C., depending upon the cyclization agent employed; the reaction times are between about 8 and 120 hours. Particularly preferred is the ring closure with 48% hydrobromic acid at about 130° C.

The morpholine ring can also be closed by heating a salt, for example, the hydrochloride, of a diol II II (X=Y=OH) to about 200–210° C., or by dehydrating the free diol on $SiO_2/Al_2O_3$ at about 375–400° C.

It is likewise possible to conduct the reaction in such a manner that the diols II (Y=Z=OH) are not isolated. Thus, it is possible to start with compounds of Formula II wherein one or both of groups Y and Z represent etherified or esterified hydroxy groups which are split or hydrolyzed, respectively, under the influence of the strongly acidic medium, with the diol II (Y=Z=OH) being formed. For example, the groups Y and/or Z can represent, in these starting compounds, methoxy, phenoxy, naphthoxy, benzyloxy, acetoxy, or benzoyloxy.

Starting compounds of Formula II wherein one of groups Y or Z represents free OH and the other represents chlorine, bromine, or iodine, are suitably cyclized by converting the OH group into the corresponding alkali alcoholate. The latter easily splits off alkali halogenide and thus forms the desired morpholine ring.

The conventional N-alkylating methods, as they are described in the literature, are employed for the cyclization of compounds III or IV. The starting compounds can be heated in the presence of an inert solvent, such as benzene, toluene, xylene; ketones, such as acetone or butanone; alcohols, such as methanol, ethanol, or isopropanol, tetrahydrofuran, or dioxane, if desired also in mixtures of these solvents with one another and/or with the addition of water. It is beneficial to add an acid-neutralizing agent, for example a hydroxide, carbonate, bicarbonate, or another salt of a weak acid of the alkali or alkaline earth metals, preferably of sodium, potassium, or calcium, or of an organic base, such as triethylamine, dimethylaniline, pyridine, or quinoline. It is also possible to conduct the reaction in the absence of a solvent by heating the starting substances in a closed tube or in an autoclave. The reaction time ranges between a few minutes and 14 days, depending upon the conditions employed. The reaction temperature is between 0 and 200° C., normally at 100–130° C. For example, if the N-alkylating reaction is conducted without a solvent at about 120° C., the reaction is normally terminated in approximately one-half to two hours.

When using solvents, however, it is usually necessary to heat the reaction mixture for 12–24 hours, in order to obtain good yields. When Z=halogen, it is advantageous to conduct the cyclization in the presence of bases, such as sodium or potassium hydroxide, sodium hydride, sodium amide, sodium ethylate, potassium tert.-butylate. Suitable solvents are water, benzene, methylene chloride, alcohols. With a solvent, the reaction progresses more rapidly at a slightly elevated temperature (up to 100° C.).

The compounds of Formula V are cyclized in accordance with the methods of the Friedel-Crafts alkylation reaction. The catalysts preferably used in this reaction are aluminum chloride, boron trifluoride, phosphoric acid, polyphosphoric acid, tin tetrachloride, or zinc chloride. The cyclization is normally conducted in solvents, but it is also possible to employ as the solvent an cess of a liquid cyclization agent. Suitable solvents are, for example, carbon disulfide and nitrobenzene.

The compounds of Formula I are also obtainable by the reduction of compounds having the basic structure of Formula I containing, in the heterocyclic rings one or several reducible groups and/or one or several double bonds. Preferably, the compounds of Formula I are obtained by reducing the compounds of the following Formulae VI to XI:

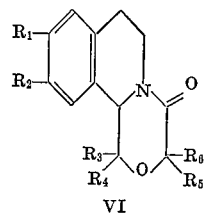
VI

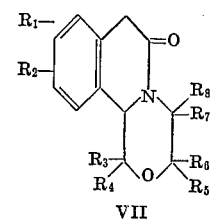
VII

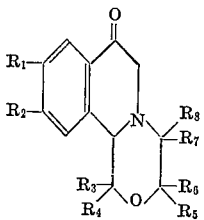
VIII

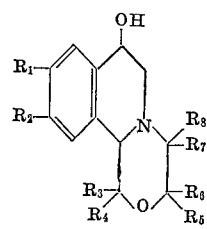
IX

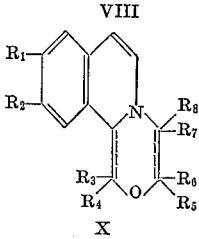
X

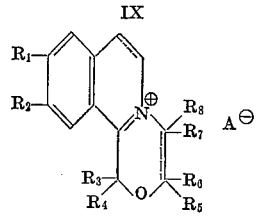
XI

The compounds of Formulae X and XI can possess, in the positions designated by dashed lines, one or two additional double bonds. A⊖ represents an anion of a strong acid, preferably chloride, bromide, perchlorate, sulfate, or phosphate.

Compounds of Formula VI are obtainable, for example, by reacting 1-hydroxymethyl-1,2,3,4-tetrahydroisoquinolines with α-halogenated acid halogenides, such as chloroacetyl chloride, and subsequent cyclization with bases, for example, potassium tert.-butylate.

The compounds of Formula VII can be produced by cyclization of 3-(2-carboxymethylphenyl)-morpholines, or by reacting 3-phenyl-morpholines with chloroacetyl chloride and ring closure with Friedel-Crafts catalysts.

Compounds of Formula VIII can be obtained by the cyclization of 4-carboxymethyl-3-phenyl-morpholines.

The compounds of Formula IX are producible by partial reduction (for example with sodium borohydride) of the compounds of Formula VIII.

The compounds of Formula X can be obtained, for example, by splitting off water from compounds of Formula IX, for example, via the p-toluenesulfonates of Formula IX, or by reaction with thionyl chloride and subsequent treatment with bases.

The compounds of Formula XI can be prepared by cyclization of 4-(2-phenylethyl)-morpholinones-(3) with phosphorus pentachloride, or phosphorus oxychloride, or a mixture of both in solvents, such as chloroform, benzene, toluene, or xylene, at temperatures of about 0–140° C.

The reduction of the compounds having the basic structure of Formula I containing, in the heterocyclic rings, one or several reducible groups and/or one or several double bonds, preferably the reduction of the compounds of Formulae VI to XI, is conducted according to methods known from the literature. Depending upon the constitution of the compound in question, the most suitable reduction agent is selected for each particular case:

Lactams of type VI or VII can be reduced, for example, satisfactorily with complex metal hydrides, such as lithium aluminum hydride. The reaction is carried out in ether, tetrahydrofuran, dioxane, di-n-butyl ether, or in mixtures of these solvents. The reaction is conducted at temperatures between room temperature and the boiling point of the solvent in use and is generally terminated after 1 to 48 hours. The reaction mixture is worked up, for example, by decomposing the excess hydride with ethyl acetate, a lower alcohol, water, or an aqueous salt solution. Another way to reduce compounds of the type VI or VII is to first convert them with diphosphorus pentasulfide into the corresponding thiolactams; the latter are then hydrogenated in the presence of Raney nickel to compounds of Formula I. The compounds of Formulae VI, VII, VIII, and IX can be further converted with phosphorus pentachloride into the corresponding chloro compounds and, finally, can be hydrogenated catalytically.

Compounds of Formulae VIII, IX, X, or XI are preferably reduced by catalytic hydrogenation. Suitable catalysts for such hydrogenation reactions are, for example, noble metal, nickel, or cobalt catalysts. The noble metal catalysts can be present on supports (for example, palladium on charcoal, calcium carbonate, or strontium carbonate), in the form of oxide catalysts (for example, platinum, palladium, or ruthenium oxide), or in the form of finely divided metal catalysts (for example, platinum black). Nickel and cobalt catalysts are suitably used as Raney metals; however, nickel can also be employed on kieselguhr or pumice as the support. The hydrogenation can be conducted at room temperature and normal pressure, or also at elevated temperature and/or elevated pressure. Preferably, pressures between 1 and 100 atmospheres and temperatures between −80° C. and +150° C. are employed.

The catalytic hydrogenation reaction is suitably conducted in the presence of a solvent, such as water, methanol, ethanol, isopropanol, tert.-butanol, ethyl acetate, tetrahydrofuran, dioxane, or acetic acid. Mixtures of these solvents can also be used. When amines are present (for example VIII, IX, or X), the free bases or the corresponding salts can be employed, for example, the hydrochlorides. Of course, the hydrogenation conditions must be selected so that other reducible groups which might be present in the molecule, as well as the benzene ring itself, are not likewise affected; this can be done by known techniques without any difficulties.

Ketones of the type VIII can also be reduced according to Clemmensen or Wolff-Kishner; in this connection, the methods described in the literature are to be employed.

Quaternary salts of the type XI can also be reduced with lithium aluminum hydride under the above-mentioned conditions or, in a simpler manner, with sodium borohydride, in methanol, ethanol, and, if desired, also in the presence of water. The reaction time is about ½ to 24 hours, preferably 1 to 2 hours, the reaction temperatures normally being between room temperature and the boiling temperature of the solvent employed.

The products of Formula I obtained according to one of the above-described methods are isolated from the reaction mixtures by standard procedures, for example, by extraction, and are then purified by such conventional steps as distillation, or crystallization of the bases, or crystallization of the salts thereof, mainly the hydrochlorides. It is likewise possible to use chromatographic methods for the isolation and purification processes.

The compounds of Formula I can be converted into the corresponding acid addition salts by means of an acid. For such a reaction, those acids are preferred which yield physiologically acceptable salts. Thus, organic and inorganic acids can be used, such as, for example, aliphatic, alicyclic, araliphatic, aromatic, or heterocyclic, mono- or polybasic carboxylic or sulfonic acids, such as formic acid, acetic acid, propionic acid, pivalic acid, diethylacetic acid, oxalic acid, malonic acid, succinic acid, pimelic acid, fumaric acid, maleic acid, lactic acid, tartaric acid, malic acid, aminocarboxylic acids, sulfamic acid, benzoic acid, salicylic acid, phenylpropionic acid, citric acid, gluconic acid, ascorbic acid, isonicotinic acid, methane-sulfonic acid, ethanedisulfonic acid, β-hydroxyethanesulfonic acid, p-toluenesulfonic acid, naphthalene-mono- and -di-sulfonic acids, sulfuric acid, nitric acid, hydrohalic acids, such as hydrochloric acid or hydrobromic acid, or phosphoric acids, such as orthophosphoric acid.

By treatment with alkylating agents, such as methyl chloride, bromide, or iodide, dimethyl sulfate, ethyl chloride, bromide, or iodide, or other alkyl halogenides or sulfates, the compounds of Formula I can also be converted into the physiologically compatible quaternary ammonium salts thereof.

The free bases of Formula I can be obtained, if desired, from the salts thereof by treatment with strong bases, such as sodium or potassium hydroxide or carbonate.

If racemates are produced in the process of the present invention, they can be separated, if desired, into the optically active antipodes thereof, in accordance with the methods described in the literature. Preferably, such a separation is conducted by reacting basic racemates with an optically active acid, for example, tartaric acid; then separating the thus-obtained diastereoisomeric salts by, for example, fractional crystallization or other conventional procedures; and subsequently liberating the optically actives bases from the separated salts.

It is also possible to obtain optically active compounds of Formula I by reacting suitable optically active starting compounds in the manner previously disclosed.

According to this invention, compounds of the following formulae, as well as the acid addition salts and quaternary ammonium salts thereof, are preferably obtained, referring to Formula I wherein the various R groups are the same as previously indicated, unless limited as follows:

(A) Compounds wherein
$R_1$ and $R_2$ represent hydrogen.

(B) Compounds wherein
$R_4$, $R_6$, and $R_8$ represent hydrogen.

(C) Compounds wherein
$R_1$ and $R_2$ each represents H, methyl, methoxy, ethoxy, or together methylenedioxy;
$R_4$, $R_6$ and $R_8$ represent hydrogen; and
$R_3$, $R_7$, and $R_5$ each represents H, alkyl, hydroxyalkyl, aryloxyalkyl, chloroalkyl, aminoalkyl, mono- or dialkylaminoalkyl of respectively up to 10 carbon atoms, or aryl or aralkyl of respectively a total of up to 10 carbon atoms, or the latter aryl or aralkyl mono- or polysubstituted by alkyl, F, Cl, Br, OH, alkoxy, methylenedioxy, or dialkylamino; and (D) Compounds wherein
$R_1$ and $R_2$ each represents H, methyl, methoxy, ethoxy, or together methylenedioxy;
$R_4$, $R_6$, and $R_8$ represent hydrogen;

$R_3$ represents H, $CH_3$, or phenyl mono- or poly- substituted, if desired, by alkyl of 1–4 carbon atoms, hydroxy, alkoxy of 1–4 carbon atoms, or methylenedioxy;

$R_5$ represents H, $CH_3$, $CH_2Cl$, $C_6H_5$, or $CH_2OC_6H_5$; and $R_7$ represents H or $CH_3$.

Preferred novel intermediates of this invention include 1-hydroxymethyl - 2-(2-hydroxyethyl) - 1,2,3,4-tetrahydroisoquinoline and all the other specific compounds of Formulae II, III, IV and V named above; furthermore, 1,3,4,6,7,11b-hexahydro-4-oxo-1,4-oxazino[3,4-a]-isoquinoline, 1,3,4,6,7,11b-hexahydro-6-oxo-1,4-oxazino[3,4-a]-isoquinoline, 1,3,4,6,7,11b-hexahydro-7-oxo-1,4-oxazino[3,4-a]-isoquinoline, 1,3,4,6,7,11b-hexahydro-7-hydroxy-1,4-oxazino[3,4-a]-isoquinoline, 3,4,6,7-tetrahydro-1H-oxazino[3,4-a]-isoquinolinium chloride.

The novel compounds can be utilized in mixture with conventional pharmaceutical excipients. Carrier substances can be such organic or inorganic substances suitable for parenteral, enteral, or topical application, and which do not react with the novel compounds, for example, water, vegetable oils, polyethylene glycols, gelatin, lactic sugar, amylose, magnesium stearate, talc, Vaseline, cholesterol, etc.

For parenteral application, particularly suitable are ampoules containing solutions, preferably oily or aqueous solutions, as well as suspensions, emulsions, or implants. For enteral application, there can be used a solid form, such as tablets or dragees incorporating talc or carbohydrate binders. Syrups containing sweetened vehicles can also be employed.

For topical application, solutions, salves, or creams can be used which are, if desired, sterilized, or mixed with auxiliary substances, such as preservatives, stabilizers, or wetting agents, or salts for influencing the osmotic pressure, or with buffer substances.

In general, the amount of carrier per 1 mg. of active agent can range from 10 to 500 mg.

The substances of this invention are preferably administered to mammals in dosages of 1 to 200 mg. per dosage unit. When administered orally, the preferred range is 10–200 mg., and when administered parenterally, the preferred range is 1–20 mg.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

18.5 g. of 1,3,4,6,7,11b-hexahydro - 4-oxo-1,4-oxazino [3,4-a]-isoquinoline in 100 ml. absolute tetrahydrofuran are added dropwise to a suspension of 10 g. lithium aluminum hydride in 100 ml. absolute tetrahydrofuran. The mixture is boiled overnight, thereafter cooled, mixed dropwise with water, filtered, and the filtrate is concentrated by evaporation. The residue is taken up in acetone and mixed with a solution of hydrogen chloride in ether. There is thus obtained 20 g. of 1,3,4,6,7,11b-hexahydro-1,4 - oxazino[3,4-a] - isoquinoline hydrochloride, M.P. 288–290° C. The substance can be recrystallized from methanol. Methoiodide M.P. 242–243° C.

The starting material can be obtained as follows:

11.2 g. 1-hydroxymethyl-isoquinoline hydrochloride are hydrogenated in 400 ml. methanol in the presence of 25 g. platinum oxide. The catalyst is removed by suction, the filtrate is concentrated under vacuum, and the residue is taken up in acetone. There is obtained 10.5 g. 1-hydroxymethyl - 1,2,3,4-tetrahydroisoquinoline hydrochloride, M.P. 196° C. (from methanol).

19.2 g. of the free base obtained from the hydrochloride in a conventional manner is mixed dropwise, in 250 ml. methylene chloride at 5–8° C., with a solution of 14.1 g. chloroacetyl chloride in 25 ml. methylene chloride. After stirring for ½ hour, 180 ml. 10% potassium bicarbonate solution is added; after continuing the stirring for one hour, the organic phase is separated, dried, and concentrated by evaporation. The residue is dissolved in 40 ml. tert.-butanol and mixed with a solution of 5.8 g. potassium in 200 ml. tert.-butanol. After allowing the reaction mixture to stand overnight, it is concentrated by evaporation and worked up in the usual manner with water and chloroform. The thus-obtained 1,3,4,6,7,11b - hexahydro - 4-oxo-1,4-oxazino[3,4-a]-isoquinoline crystallizes after the addition of ether; there is obtained 18.5 g., M.P. 86–88° C.

Example 2

5 g. 1-hydroxymethyl-2-(2-hydroxyethyl)-1,2,3,4-tetrahydroisoquinoline is heated overnight to 130° C. in 50 ml. 48% hydrobromic acid. Upon cooling of the reaction mixture, there is obtained 5.5 g. of 1,3,4,6,7,11b-hexahydro - 1,4 - oxazino[3,4-a]-isoquinoline hydrobromide, M.P. 290–292° C. (from methanol).

The stirring material is obtained by reacting 10 g. 1-hydroxymethyl - 1,2,3,4-tetrahydroisoquinoline with 5 g. ethylene oxide in 30 ml. benzene and 5 ml. ethanol, the reaction mixture being allowed to stand overnight to complete the reaction. Hydrochloride, M.P. 128–130° C. (from ethanol/acetone).

Example 3

26.5 g. N-homoveratrylmorpholinone-(2) is boiled for 3 hours with 20 ml. phosphorus oxychloride in 50 ml. toluene. The solvent is distilled off under vacuum, the residue is washed with toluene, dissolved in dilute hydrochloric acid, and washed several times with benzene. The acidic solution is made alkaline with solution of sodium hydroxide, and extracted with benzene. After the benzene has been removed by evaporation, the residue is taken up in ethanol and converted into the hydrochloride with ethereal hydrogen chloride solution. There is obtained 23 g. 9,10 - dimethoxy-3,4,6,7-tetrahydro-1H-oxazino[3,4-a]-isoquinolinium chloride. The quaternary salt is taken up in ethanol and reduced with 5 g. sodium borohydride. The reaction mixture is made alkaline with solution of sodium hydroxide, shaken out with benzene, and chromatographed with benzene on aluminum oxide. There is obtained 9,10-dimethoxy - 1,3,4,6,7,11b - hexahydro-oxazino[3,4-a]-isoquinoline, M.P. 118–120° C. Hydrochloride, M.P. 246° C.

The starting compound is obtained by reacting homoveratrylamine with 2-chloroethanol in boiling toluene (for 5 hours), obtaining N-2-hydroxyethyl-homoveratrylamine (B.P. 152–154° C./0.005 mm. Hg). The latter compound is reacted with chloroacetyl chloride in dichloromethane under ice-cooling to N-chloroacetyl-N-(2-hydroxyethyl)-homoveratrylamine (M.P. 90–92° C., from ethyl acetate/ether), and then a cyclization step is conducted with ethanolic sodium ethylate solution at room temperature (allowing the reaction mixture to stand overnight). The N-homoveratrylmorpholinone-(2) boils at 171–173° C./0.01 mm. Hg, and melts at 63–65° C. (from ether).

Example 4

8.1 g. 1-hydroxymethyl-1,2,3,4-tetrahydroisoquinoline is dissolved in 25 ml. benzene and 5 ml. ethanol, mixed with 7.0 g. styrene oxide, and boiled for 10 hours. Thereafter, the solvents are removed by evaporation, the residue is taken up in dilute hydrochloric acid and shaken out with methylene chloride. The acidic phase is made alkaline with solution of sodium hydroxide and extracted with methylene chloride. The methylene chloride is removed by evaporation, and the residue is heated with 40 ml. 48% hydrobromic acid for 2 days to 130° C. Upon cooling, the hydrobromide of 3-phenyl-1,3,4,6,7,11b - hexahydro-1,4-oxazino[3,4-a] - isoquinoline crystallizes out. The latter compound is converted into the base by treatment with dilute solution of sodium hydroxide and ether, and this base is converted into the hydrochloride (M.P. 228–230° C.) with ethereal hydrochloric acid.

Example 5

3.8 g. 1 - phenyl - hydroxymethyl-2-(2-hydroxyethyl)-1,2,3,4-tetrahydroisoquinoline is heated with 60 ml. 48% hydrobromic acid for 12 hours at 130° C. The excess hydrobromic acid is distilled off under vacuum, the residue is made alkaline, and shaken out with methylene chloride. After concentrating the reaction mixture by evaporation, there is obtained from acetone/petroleum ether the 1-phenyl - 1,3,4,6,7,11b - hexahydro-1,4-oxazino[3,4-a]-isoquinoline, M.P. 98–100° C. Hydrochloride, M.P. 228–229° C.

Preparation of the starting material:

8.8 g. 1-phenyl-hydroxymethyl-isoquinoline is hydrogenated in 200 ml. methanol with 1 g. platinum oxide. After the solution is filtered, concentrated, and treated with ethereal hydrochloric acid, there is obtained 1-phenyl-hydroxymethyl - 1,2,3,4 - tetrahydroisoquinoline hydrochloride, M.P. 202° C. (from ethanol/ether).

4.7 g. 1-phenyl-hydroxymethyl-1,2,3,4 - tetrahydroisoquinoline is allowed to stand at room temperature in 30 ml. ethanol with 2 ml. ethylene oxide for 12 hours. The solvent is removed by evaporation, and the residue is converted, from acetone with ethereal hydrochloric acid, into 1-phenyl - hydroxymethyl-2-(2-hydroxyethyl)-1,2,3,4-tetrahydroisoquinoline hydrochloride; M.P. 192° C. (from ethanol/ether).

Example 6

2.2 g. 1-diphenyl - hydroxymethyl-2-(2-hydroxyethyl)-1,2,3,4-tetrahydroisoquinoline in 20 ml. 48% hydrobromic acid are heated for 12 hours at 130° C. After concentrating under vacuum, the reaction mixture is made alkaline, shaken out with methylene chloride, concentrated by evaporation and converted, with hydrochloric acid in ethanol/ether, into 1,1-diphenyl-1,3,4,6,7,11b-hexahydro-1,4 - oxazino[3,4-a] - isoquinoline hydrochloride, M.P. 215° C.

Preparation of the starting compound:

78 g. 1-cyano-2-benzoyl-1,2-dihydroisoquinoline is dissolved in a mixture of 580 ml. ether and 289 ml. dioxane, and mixed with a phenyl lithium solution (from 16.5 g. lithium, 207 g. bromobenzene, and 1000 ml. ether) at 0° C. Thereafter, the reaction mixture is stirred for 12 hours at room temperature, decomposed with alcohol, diluted with water, and shaken out with ether. The ethereal layer is concentrated by evaporation, and there crystallizes 1-diphenyl-hydroxymethyl-isoquinoline, M.P. 144° C. (from ethanol).

Hydrogenation of the product on platinum oxide in methanol yields 1 - diphenyl - hydroxymethyl - 1,2,3,4-tetrahydroisoquinoline (hydrochloride, M.P. 259–260° C., from ethanol) which is converted into the free base and reacted, with ethylene oxide in ethanol (for 48 hours at room temperature) to yield 1-diphenyl-hydroxymethyl-2-(2-hydroxyethyl) - 1,2,3,4 - tetrahydroisoquinoline (M.P. 155–156° C., from ethanol).

Example 7

16 g. 1-hydroxymethyl-1,2,3,4 - tetrahydroisoquinoline in 50 ml. benzene and 20 ml. ethanol is heated with 7 g. propylene oxide for 10 hours in an autoclave to 80° C. Thereafter, the solvent is evaporated, the non-crystallizing residue is dissolved in 100 ml. 48% hydrobromic acid, and heated for 10 hours to 130° C. The mixture is cooled, made alkaline, and extracted with ether. The ether solution is concentrated by evaporation, the residue is taken up in acetone, and precipitated with hydrogen chloride. There is obtained 3-methyl-1,3,4,6,7,11b - hexahydro-1,4,-oxazino[3,4-a]-isoquinoline hydrochloride, M.P. 269–270° C. Yield: 3 g.

Example 8

8.3 g. 1-hydroxymethyl-2-(2-hydroxy-2-methylpropyl)-1,2,3,4-tetrahydroisoquinoline are heated, in 100 ml. 48% hydrobromic acid, for 12 hours at 130° C. After cooling, the reaction mixture is made alkaline, extracted with ether, and the product is chromatographed on silica gel with chloroform. The base is converted, with hydrogen chloride, into 3,3-dimethyl-1,3,4,6,7,11b-hexahydro-1,4-oxazino[3,4-a]-isoquinoline hydrochloride. Yield: 2.2 g., M.P. 273–274° C. (from ethanol/ether).

Preparation of the starting compound:

32.6 g. 1-hydroxymethyl-1,2,3,4-tetrahydroisoquinoline are boiled for 10 hours in 200 ml. benzene with 21.6 g. 1-chloro-2-methyl-propanol-(2) and with a solution of 8 g. potassium in 100 ml. ethanol. After the reaction mixture has been worked up, the crude product is chromatographed on silica gel with chloroform/methanol (9:1); hydrochloride, M.P. 114–116° C.

Example 9

1 g. 1-hydroxymethyl-2-(2-chloroethyl)-1,2,3,4-tetrahydroisoquinoline (obtained from 1-hydroxymethyl-1,2,3,4-tetrahydroisoquinoline and 1-chloro-2-bromoethane) is boiled for 3 hours in a solution of 0.4 g. potassium in 50 ml. tert.-butanol. The reaction mixture is concentrated, water is added, and then the mixture is extracted with ether, dried over sodium sulfate, and the 1,3,4,6,7,11b-hexahydro-1,4-oxazino[3,4-a]-isoquinoline is precipitated as the hydrochloride; M.P. 288–290° C.

Example 10

225 mg. 1-(2-chloroethoxymethyl)-1,2,3,4-tetrahydroisoquinoline (produced by reacting 1-hydroxymethyl-isoquinoline with 2-chloroethanol, hydrogenation on platinum oxide and reaction with thionyl chloride) are reacted, analogously to Example 9, with a solution of 0.1 g. potassium in 15 ml. tert.-butanol, and worked up. There is obtained 1,3,4,6,7,11b-hexahydro-1,4-oxazino[3,4-a]-isoquinoline hydrochloride, M.P. 288–290° C.

Example 11

225 mg. 3 - [o - (2 - chloroethyl)phenyl]-morpholine (producible by reacting 3-[o-(2-hydroxyethyl)-phenyl]-morpholine with thionyl chloride) is reacted, analogously to Example 9, with a solution of 0.1 g. potassium in 15 ml. tert.-butanol, and worked up. There is obtained 1,3,4,6,7,11b - hexahydro-1,4-oxazino[3,4-a]-isoquinoline hydrochloride, M.P. 288–290° C.

Example 12

270 mg. 3-phenyl-4-(2-bromoethyl)-morpholine are dissolved under cooling with 300 mg. aluminum chloride in 10 ml. nitrobenzene, and stirred for 10 hours at room temperature. Then, the reaction mixture is heated for 2 hours on a steam bath, poured onto a mixture of concentrated hydrochloric acid and ice, and worked up, there being obtained 1,3,4,6,7,11b - hexahydro-1,4-oxazino[3,4-a]-isoquinoline hydrochloride, M.P. 388–290° C.

Example 13

Analogously to Example 1, 1,3,4,6,7,11b-hexahydro-6-oxo-1,4-oxazino[3,4-a]-isoquinoline (obtainable by treating 3-(o-carboxymethylphenyl)-morpholine with thionyl chloride and subsequently with triethylamine) is reacted with lithium aluminum hydride to 1,3,4,6,7,11b-hexahydro-1,4-oxazino[3,4-a]-isoquinoline hydrochloride, M.P. 288–290° C.

Example 14

A mixture of 1 g. amalgamated zinc, 2 ml. water, 5 ml. concentrated hydrochloric acid, and 500 mg. 1,3,4,6,7,11b-hexahydro-7-oxo - 1,4 - oxazino[3,4-a]-isoquinoline (obtainable by reacting 3-phenyl-4-carboxymethyl-morpholine with aluminum chloride) is boiled for 10 hours; during this reaction, after 3.6 and 8 hours, respectively, there are added 2 ml. portions of concentrated hydrochloric acid. Then, the reaction mixture is cooled, filtered, the filtrate made alkaline, and worked up. There is obtained 1,3,4,6,7,11b-hexahydro - 1,4 - oxazino[3,4-a]-isoquinoline hydrochloride, M.P. 288–290° C.

Example 15

100 mg. 7 - hydroxy-1,3,4,6,7,11b-hexahydro-1,4-oxazino[3,4-b]-isoquinoline hydrochloride (obtainable by reducing the corresponding 7-oxo compound with sodium borohydride) in 10 ml. ethanol is shaken on 50 mg. 5% palladium charcoal at room temperature and normal pressure with hydrogen. The reaction mixture is filtered off, worked up, and there is obtained 1,3,4,6,7,11b-hexahydro-1,4-oxazino[3,4-a]-isoquinoline hydrochloride, M.P. 288–290° C.

Example 16

An ethereal solution of 1,3,4,11b-tetrahydro-1,4-oxazino[3,4-b]-isoquinoline (obtained by converting 7-hydroxy - 1,3,4,6,7,11b - hexahydro-1,4-oxazino[3,4-b]-isoquinoline into the p-toluenesulfonate, subsequent treatment with potassium tert.-butylate, and working up of the reaction product) is hydrogenated, analogously to Example 15, on 5% palladium charcoal, and worked up. There is obtained 1,3,4,6,7,11b-hexahydro-1,4-oxazino[3,4-a]-isoquinoline hydrochloride, M.P. 288–290° C.

Example 17

Analogously to Example 2, there are obtained, by reacting the correspondingly substituted 1-hydroxymethyl-2-(2-hydroxyethyl) - 1,2,3,4 - tetrahydroisoquinoline with hydrogen bromide, the following 1,3,4,6,7,11b-hexahydro-1,4-oxazino[3,4-a]-isoquinolines:

1-methyl-,
4-methyl-,
1,1-dimethyl-,
1,3-dimethyl-,
1,1,3,3-tetramethyl-,
3,3,4,4-tetramethyl-,
1,1,3,3,4,4-hexamethyl-,
1,3-diphenyl-,
3,3-diphenyl-,
1(3,4-methylenedioxyphenyl)-,
1-(3,4-dimethoxyphenyl)-,
3-(3,4-methylenedioxyphenyl)-,
1-(p-dimethylaminophenyl)-,
1-naphthyl-(1)-,
3-naphthyl-(1)-,
1-(2-phenylethyl)-,
3-chloromethyl-,
3-hydroxymethyl-,
1-methyl-3-phenyl-,
1-phenyl-3-methyl-,
1-phenyl-3,3-dimethyl-,
1-methyl-3,3-diphenyl-,
3-p-dimethylaminophenyl-,
9,10-dimethyl-,
1,9,10-trimethyl-,
9,10-methylenedioxy-.

The following examples cover suitable pharmaceutical compositions which can be prepared according to conventional procedures.

Example A.—Tablets

| | Mg. |
|---|---|
| 1,3,4,6,7,11b-hexahydro-1,4-oxazino[3,4-a]-isoquinoline hydrochloride | 20 |
| Lactose | 100 |
| Corn starch | 20 |
| Talc | 10 |

Example B.—Coated tablets

| | Mg. |
|---|---|
| 1,3,4,6,7,11b-hexahydro-1,4-oxazino[3,4-a]-isoquinoline hydrochloride | 20 |
| Lactose | 95 |
| Talc | 5 |

The coating consists of a mixture of cane sugar, talc, corn starch, and tragacanth and weighs about 100 mg.

Example C.—Solution for injections

A solution of 2 kg. of 1,3,4,6,7,11b-hexahydro-1,4-oxazino[3,4-a]-isoquinoline hydrochloride in 1998 litres of distilled water is prepared and filled into 2 ml. ampoules in such a manner that each ampoule contains 2 mg. of the active ingredient.

Example D.—Syrup

The unit dosage contains:

| | Mg. |
|---|---|
| 1,3,4,6,7,11b-hexahydro-1,4-oxazino[3,4-a]-isoquinoline hydrochloride | 20 |
| Cane sugar | 300 |
| Glycerol (twice distilled) | 500 |
| Methyl p-hydroxybenzoate | 4 |
| Propyl p-hydroxybenzoate | 2 |
| Flavor, q.s. | |
| Water (distilled) | 4200 |

Instead of 1,3,4,6,7,11b-hexahydro-1,4-oxazino [3,4-a]-isoquinoline hydrochloride the free base or other physiologically compatable acid addition or quaternary ammonium salts of the same base as well as other compounds embraced by Formula I or their physiologically compatible acid addition or quaternary ammonium salts can be incorporated into similar pharmaceutical preparations.

Blood pressure and blood flow were determined by a test procedure similarly to that described by Hotovy et al., Arzneimittelforschung, vol. 11, pages 20–24 (1961).

The preceding example can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A member selected from the group consisting of a compound of the following formula, a physiologically compatible acid addition salt thereof, and a physiologically compatible lower alkyl quaternary ammonium halide or sulfate thereof:

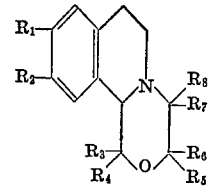

wherein $R_1$ and $R_2$ are each H, alkyl of 1–4 carbon atoms, methoxy, ethoxy, Cl, Br, or together methylenedioxy, and $R_3$ to $R_8$ each represents H; unsubstituted alkyl of 1–10 carbon atoms, or monosubstiuted alkyl of a total of 1–10 carbon atoms wherein the monosubstituent is Cl, Br, OH, alkoxy, phenoxy, amino, or alkylated amino; unsubstituted phenyl or naphthyl, or substituted phenyl or naphthyl of a total of 6–10 carbon atoms wherein the substituents are not more than 3 of alkyl, F, Cl, Br, OH, alkoxy, methylenedioxy, or dialkylamino; or unsubstituted phenyl(lower) alkyl, or monosubstituted phenyl(lower) alkyl of a total of 7–10 carbon atoms wherein the monosubstituent is alkyl, F, Cl, Br, OH, alkoxy, methylenedioxy or dialkylamino, with the provision that at least one of $R_3$, $R_5$ and $R_7$ represents H.

2. A member as defined by claim 1 wherein $R_1$ and $R_2$ represent hydrogen.

3. A member as defined by claim 1 wherein $R_4$, $R_6$, and $R_8$ represent hydrogen.

4. A member as defined by claim 1 wherein $R_1$ and $R_2$ each represents H, methyl, methoxy, ethoxy, or together methylenedioxy; $R_4$, $R_6$ and $R_8$ represent hydrogen, and $R_3$, $R_7$ and $R_5$ each represents H, alkyl, hydroxyalkyl, phenoxyalkyl, chloroalkyl, aminoalkyl, mono- or dialkyl-aminoalkyl of respectively up to 10 carbon atoms, naphthyl, phenyl, phenyl(lower)alkyl, substituted naphthyl or phenyl of a total of 6–10 carbon atoms wherein the substituents are 1–3 of alkyl, F, Cl, Br, OH, alkoxy, methylenedioxy, or dialkylamino, or monosubstituted phenyl(lower)alkyl of a total of 7–10 carbon atoms wherein the monosubstituent is alkyl, F, Cl, Br, OH, alkoxy, methylenedioxy or dialkylamino.

5. A member as defined by claim 1 wherein $R_1$ and $R_2$ each represents H, methyl, methoxy, ethoxy, or together methylenedioxy; $R_4$, $R_6$, and $R_8$ represent hydrogen; $R_3$ represents H, $CH_3$, or unsubstituted phenyl, or phenylsubstituted by alkyl of 1–4 carbon atoms, hydroxy, alkoxy of 1–4 carbon atoms, or methylenedioxy; $R_5$ represents H, $CH_3$, $CH_2Cl$ or phenyl, or $CH_2OC_6H_5$; and $R_7$ represents H or $CH_3$.

6. A member as defined by claim 1, wherein not more than two of $R_3$–$R_8$ represent said phenyl, naphthyl, phenyl(lower)alkyl or substituted derivatives thereof.

7. A member as defined by claim 1, wherein $R_1$ and $R_2$ each is H or methoxy, $R_3$ and $R_5$ each is H, $CH_3$ or phenyl, $R_4$ is H or phenyl, $R_6$ is H or $CH_3$; $R_7$ and $R_8$ each is H.

8. A member as defined by claim 1 selected from the group consisting of 1,3,4,6,7,11b-hexahydro-1,4-oxazino [3,4-a]-isoquinoline, a physiologically compatible acid additon salt thereof, and a physiologically compatible lower alkyl quaternary ammonium halide or sulfate thereof.

9. A member as defined by claim 1 selected from the group consisting of 1-methyl-1,3,4,6,7,11b-hexahydro-1,4-oxazino[3,4-a]-isoquinoline, a physiologically compatible acid addition salt thereof, and a physiologically compatible lower alkyl quaternary ammonium halide or sulfate thereof.

10. A member as defined by claim 1 selected from the group consisting of 3-methyl-1,3,4,6,7,11b-hexahydro-1,4-oxazino-[3,4-a]-isoquinoline, a physiologically compatible acid addition salt thereof, and a physiologically compatible lower alkyl quaternary ammonium halide or sulfate thereof.

11. A member as defined by claim 1 selected from the group consisting of 1,1-dimethyl-1,3,4,6,7,11b-hexahydro-1,4-oxazino-[3,4-a]-isoquinoline, a physiologically compatible acid addition salt thereof, and a physiologically compatible lower alkyl quaternary ammonium halide or sulfate thereof.

12. A member as defined by claim 1 selected from the group consisting of 3,3-dimethyl-1,3,4,6,7,11b-hexahydro-1,4-oxazino-[3,4-a]-isoquinoline, a physiologically compatible acid addition salt thereof, and a physiologically compatible lower alkyl quaternary ammonium halide or sulfate thereof.

13. A member as defined by claim 1 selected from the group consisting of 9,10-dimethoxy-1,3,4,6,7,11b-hexahydro - 1,4 - oxazino[3,4-a] - isoquinoline, a physiologically compatible acid addition salt thereof, and a physiologically compatible lower alkyl quaternary ammonium halide or sulfate thereof.

References Cited

UNITED STATES PATENTS 3,042,671    7/1962    Lombardino et al. _____ 260—243

OTHER REFERENCES

Schneider et al.: Arch. Pharm., vol. 294, pp. 645–54 (1961).

HENRY R. JILES, *Primary Examiner.*

NATALIE TROUSOF, *Assistant Examiner.*

U.S. Cl. X.R.

260—247, 247.1 247.2, 247.5, 247.7, 268, 283, 287, 288, 289; 424—248